US012744438B2

(12) United States Patent
Jinchang

(10) Patent No.: US 12,744,438 B2
(45) Date of Patent: Sep. 22, 2026

(54) ELECTRIC MOTOR HAVING ROTOR AND SQUIRREL CAGE WINDING

(71) Applicant: SEW-EURODRIVE GMBH & CO. KG, Bruchsal (DE)

(72) Inventor: Li Jinchang, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 376 days.

(21) Appl. No.: 18/270,572

(22) PCT Filed: Nov. 30, 2021

(86) PCT No.: PCT/EP2021/025475
§ 371 (c)(1),
(2) Date: Jun. 30, 2023

(87) PCT Pub. No.: WO2022/144089
PCT Pub. Date: Jul. 7, 2022

(65) Prior Publication Data

US 2024/0063701 A1 Feb. 22, 2024

(30) Foreign Application Priority Data

Dec. 30, 2020 (CN) ......................... 202011624853.4
Feb. 2, 2021 (DE) ......................... 102021000493.0

(51) Int. Cl.
*H02K 19/14* (2006.01)
*H02K 17/16* (2006.01)
*H02K 17/20* (2006.01)

(52) U.S. Cl.
CPC ............. *H02K 19/14* (2013.01); *H02K 17/16* (2013.01); *H02K 17/168* (2023.05); *H02K 17/20* (2013.01)

(58) Field of Classification Search
CPC ...... H02K 17/16; H02K 17/168; H02K 17/20; H02K 19/14
(Continued)

(56) References Cited

U.S. PATENT DOCUMENTS 1,945,028 A 1/1934 Almaine et al.
3,396,295 A 8/1968 Hindle
(Continued)

FOREIGN PATENT DOCUMENTS

CA 1107338 A * 8/1981 ............... H02K 3/42
CN 201277427 Y 7/2009
(Continued)

OTHER PUBLICATIONS

KR 102010026 B1 machine translation from espacenet (Year: 2019).*
(Continued)

*Primary Examiner* — Oluseye Iwarere
*Assistant Examiner* — Justin Stefanon
(74) *Attorney, Agent, or Firm* — Carter, DeLuca & Farrell LLP

(57) ABSTRACT

An electric motor includes a rotor and a squirrel cage winding. The squirrel cage winding has two rings, which are axially spaced apart from each other and are interconnected by bars. The rotor has cutouts axially extending all the way through for receiving bars, and the cutouts are spaced apart from each other in the circumferential direction. The rotor has radially outwardly open axial grooves, and the radial distance range covered by the axial grooves contains the radial distance range covered by the bars.

23 Claims, 7 Drawing Sheets

(58) Field of Classification Search
USPC .................................. 310/211, 214, 216.069
See application file for complete search history.

(56) References Cited

U.S. PATENT DOCUMENTS

| | | | | |
|---|---|---|---|---|
| 5,801,473 | A * | 9/1998 | Helwig .................. | H02K 1/182 310/216.061 |
| 2010/0123365 | A1* | 5/2010 | Gasparini .............. | H02K 3/487 310/214 |
| 2014/0097721 | A1* | 4/2014 | Lang ...................... | H02K 17/20 29/598 |

FOREIGN PATENT DOCUMENTS

| | | | |
|---|---|---|---|
| DE | 1860673 | U | 10/1962 |
| DE | 7224206 | U | 11/1973 |
| EP | 1524755 | A1 | 4/2005 |
| GB | 1141922 | A | 2/1969 |
| KR | 20090007050 | A | 1/2009 |
| KR | 102010026 | B1 | 8/2019 |

OTHER PUBLICATIONS

International Search Report issued in corresponding International Application No. PCT/EP2021/025475 dated Feb. 28, 2022, pp. 1-2, English Translation.

Written Opinion issued in corresponding International Application No. PCT/EP2021/025475 dated Feb. 28, 2022, pp. 1-7, English Translation.

Chinese Office Action issued by the China National Intellectual Property Administration on Dec. 25, 2025 in corresponding CN Patent Application No. 202011624853.4, with English translation.

* cited by examiner 8
30
50
50

30
30
30
8

ELECTRIC MOTOR HAVING ROTOR AND SQUIRREL CAGE WINDING

FIELD OF THE INVENTION

The present invention relates to an electric motor having a rotor and a squirrel cage winding.

BACKGROUND INFORMATION

In certain conventional systems, an electric motor having a squirrel cage winding can be operated as an asynchronous motor.

German Patent Document No. 18 60 673 describes an AC motor.

A reluctance motor fed from a single-phase network is described in German Patent Document No. 72 24 206.

A synchronous motor is described in U.S. Pat. No. 1,945,028.

An AC motor is known from U.K. Patent Document No. 1,141,922.

SUMMARY

Example embodiments of the present invention provide an electric motor, which, despite being simple to produce, allows for improved operation of the electric motor.

According to example embodiments, an electric motor includes a rotor and a squirrel cage winding. The squirrel cage winding has two rings, which are axially spaced apart from each other, i.e., for example, in the direction of the axis of rotation of the rotor, and are interconnected, e.g., electrically connected, by bars. The rotor has cutouts axially extending all the way through for receiving bars, and the cutouts are spaced apart from each other in the circumferential direction.

The rotor has radially outwardly open axial grooves, and the radial distance range covered by the axial grooves contains the radial distance range covered by the bars.

Thus, it is possible to operate the electric motor as an asynchronous motor on the one hand and as a reluctance motor on the other hand in a simple combined manner. The electric motor is thus further arranged to allow advantageous start-up of the motor and an operation which, in continuous operation, is synchronous with the frequency of the rotating field generated by the stator of the motor. In addition, it is readily possible to carry out the production. This is because only axial grooves are additionally milled on the rotor of the asynchronous motor to provide reluctance operation.

According to example embodiments, the ring axis of the rings, e.g., of the rings arranged, for example, as circular rings, is aligned coaxially with the axis of rotation of the rotor. Thus, the squirrel cage winding is aligned coaxially with the rotor shaft.

According to example embodiments, the axial grooves have a vanishing helix angle. Thus, the reluctance operation can be performed in parallel to the asynchronous operation.

According to example embodiments, the axial grooves have a first helix angle, and the bars have a second helix angle, which is different from the second helix angle. For example, the first helix angle is zero and the second helix angle has a value between 5° and 30°. Thus, the asynchronous operation generates a different Polrasten than the reluctance operation, so that a reduced Polrasten can be effected overall.

According to example embodiments, the circumferential angular region covered by the respective axial groove at a respective axial position is independent of the axial position. Thus, the axial groove extends only in the axial direction and thus, in contrast to the bars of the squirrel cage winding, causes a different Polrasten, so that the superimposition of the cogging torque fluctuations during rotary operation of the motor allows a reduced amplitude.

According to example embodiments, the axial grooves have a cross section independent of the axial position. Thus, the axial grooves can be machined by moving a milling tool in the axial direction along the rotor.

According to example embodiments, the circumferential angular region covered by the respective axial groove at a respective axial position is greater in amount than the region covered by the respective bar in the circumferential direction, e.g., at least three times greater. Thus, the effect of a respective groove can be dimensioned larger than the effect of a single bar, especially at the synchronous speed of the motor. This is because the groove width effects correspondingly dimensioned reluctance poles.

According to example embodiments, the respective ring is fastened to the rotor by a bayonet catch, e.g., in that the ring has an elongated hole extending in the circumferential direction, through which hole projects a screw which is screwed into an axially oriented threaded hole of the rotor, the screw head of which presses the ring onto the ends of bars, in which the axial wall thickness of the ring at the edge region of the elongated hole increases with increasing circumferential angle or increases with decreasing circumferential angle. Thus, a simple but also safe fastening is possible, which provides for resilient contacting.

According to example embodiments, in the respective circumferential angular region not interrupted by the axial grooves, the cutouts are regularly spaced from each other in the circumferential direction. Thus, the squirrel cage winding has bars regularly spaced from each other in the circumferential direction, e.g., at least in the regions not interrupted by axial grooves.

According to example embodiments, the material of the rotor has a higher magnetic permeability than the material of the rotor shaft. Thus, a sufficiently strong reluctance effect can be generated.

According to example embodiments, the axial grooves are regularly spaced from each other in the circumferential direction. For example, the number of axial grooves is between three and nine. Thus, synchronous operation of the motor can be achieved by the reluctance effect.

According to example embodiments, the axial grooves are formed on the rotor extending all the way through. Thus, as great a reluctance effect as possible can be achieved.

According to example embodiments, the rotor is arranged as a stack of metal sheets. For example, the rotor is arranged as a stack of individual sheets, each of which is manufactured as punched parts, and the individual sheets are welded together and/or pressed onto each other by a tie rod passing axially through the stack. For example, the stacking direction is aligned parallel to the axial direction. Thus, low losses are effected despite the rotating field, i.e., for example, an alternating magnetic field. The stacking direction is parallel to the axial direction. For example, the sheet used is electrical sheet, e.g., sheet containing iron silicide.

By filling the cutouts with the material, e.g., aluminum or copper, the stack of metal sheets is mechanically stabilized after the material has cooled, so that the grooves can be formed by milling.

According to example embodiments, first bars of the squirrel cage winding connect the two rings with each other and other bars terminate blindly in respective grooves. Thus, ready easy production is possible by first pouring material into cutouts and then milling the grooves.

Further features and aspects of example embodiments of the present invention are explained in more detail below with reference to the appended schematic Figures.

DETAILED DESCRIPTION

Figure 1:
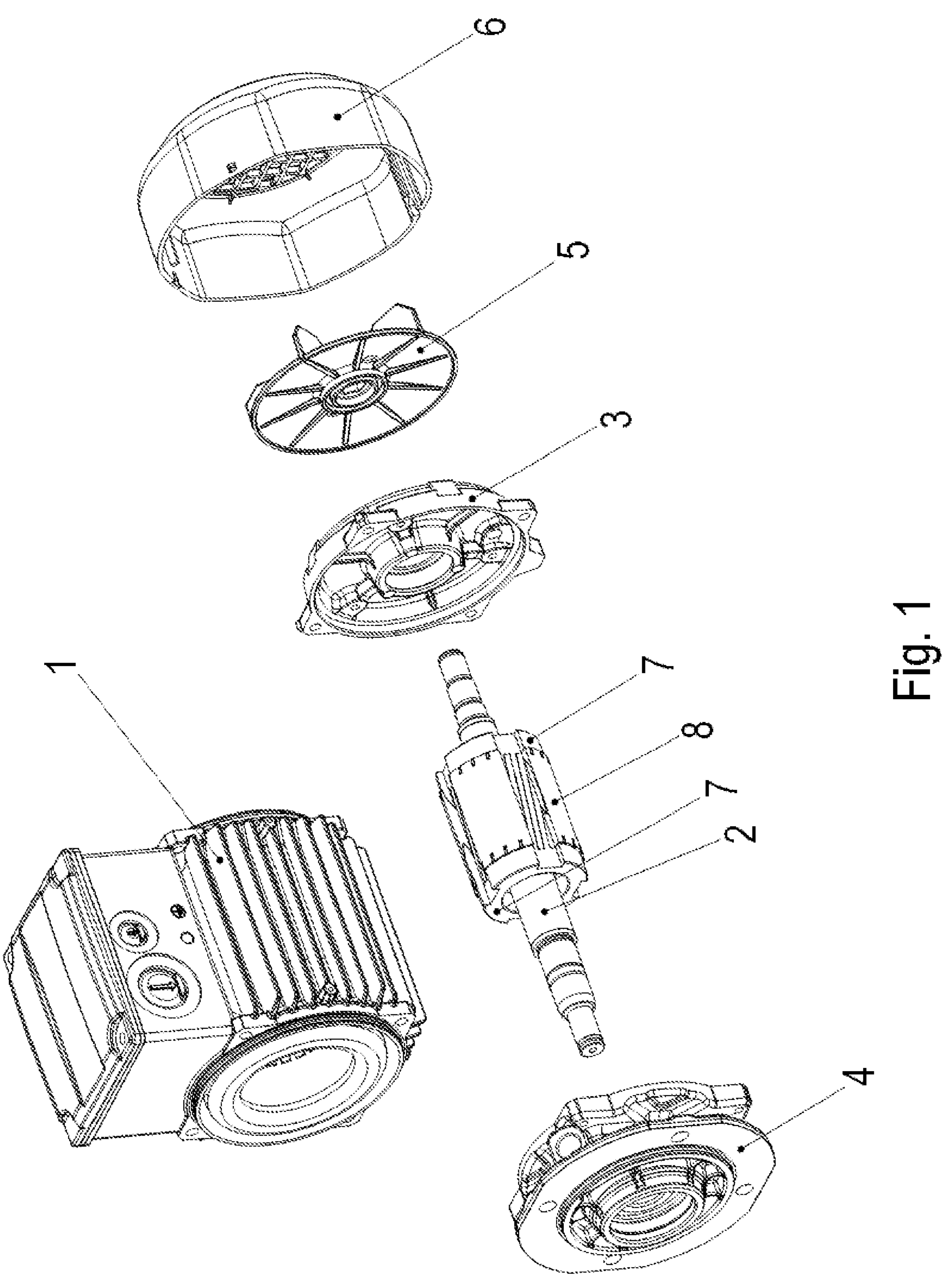
FIG. 1 is an exploded view of an electric motor according to an example embodiment of the present invention.
Figure 2:
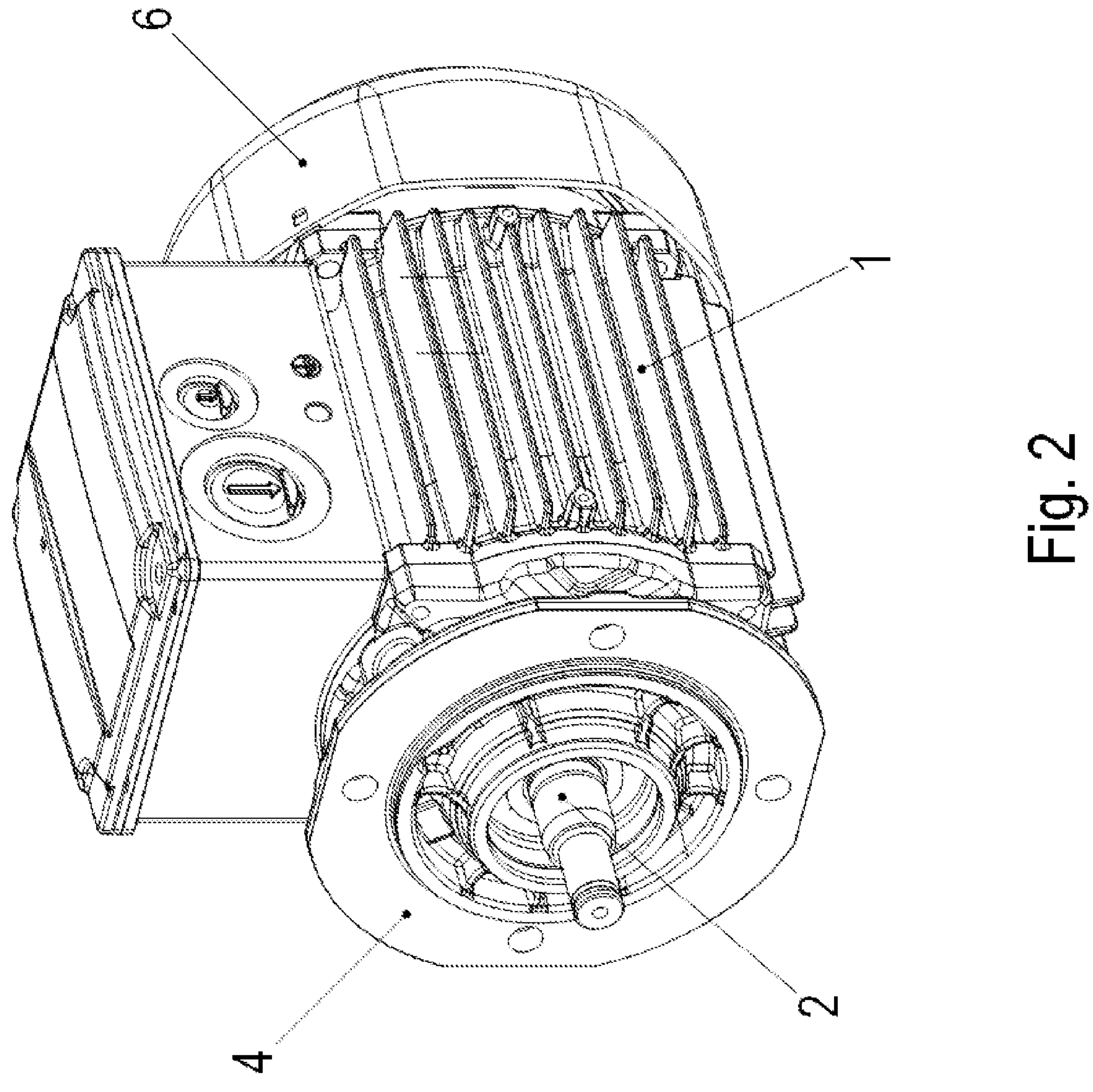
FIG. 2 is a perspective view of the electric motor.
Figure 3:
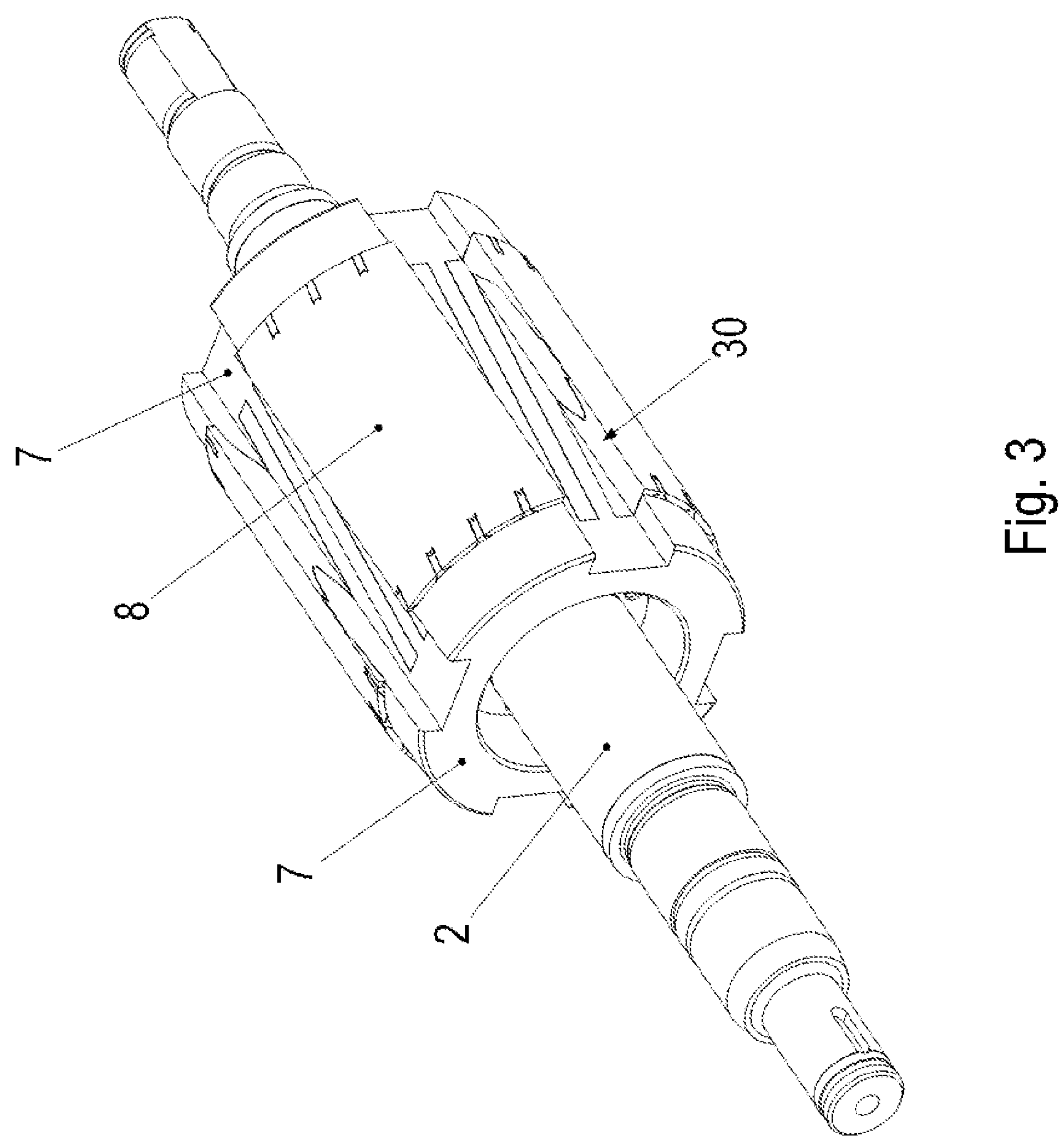
FIG. 3 is a perspective view of the rotor slid onto the rotor shaft 2.
Figure 4:
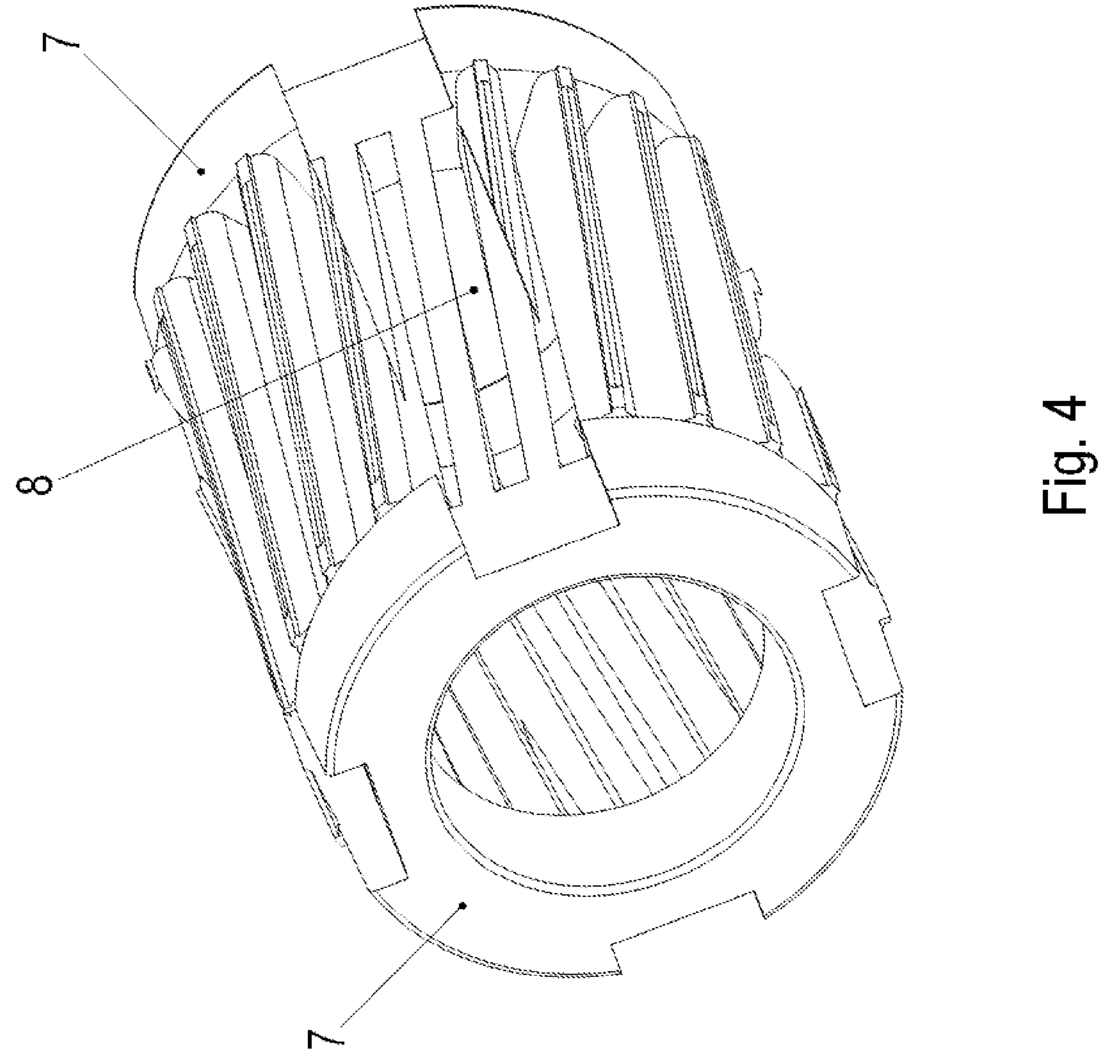
FIG. 4 is a perspective view of the squirrel cage winding.
Figure 5:
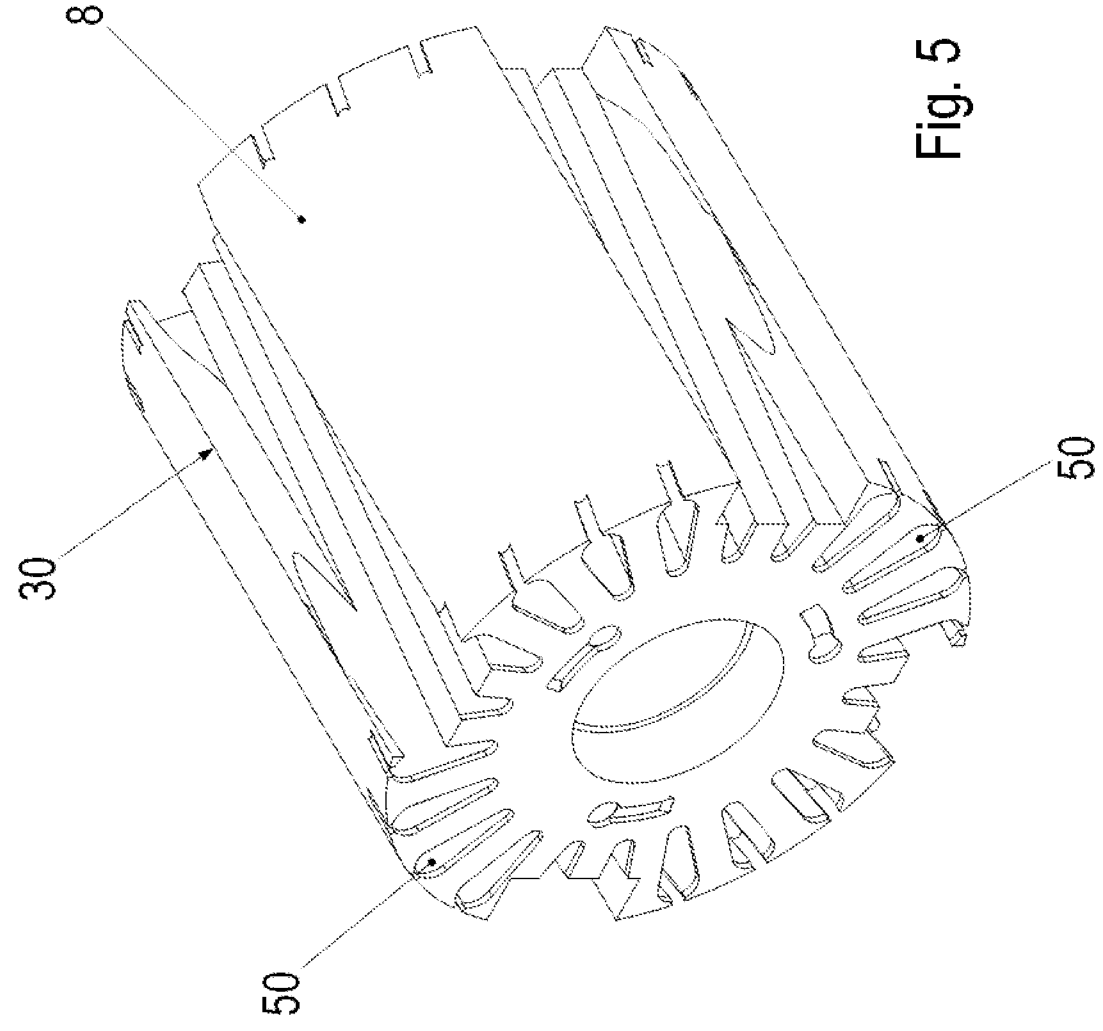
FIG. 5 is a perspective view of the rotor without a squirrel cage winding.
Figure 6:
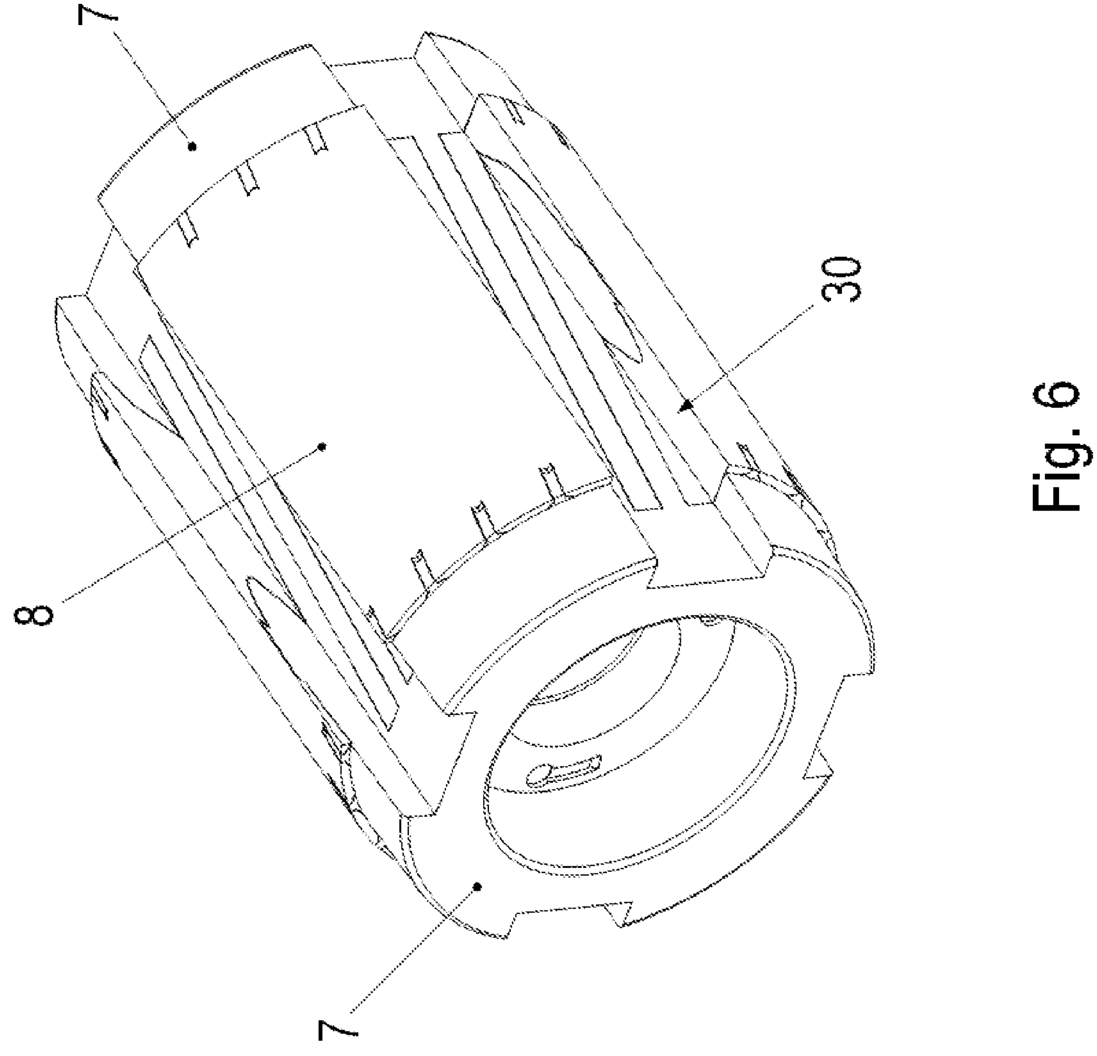
FIG. 6 is a perspective view of the rotor with a squirrel cage winding.
Figure 7:
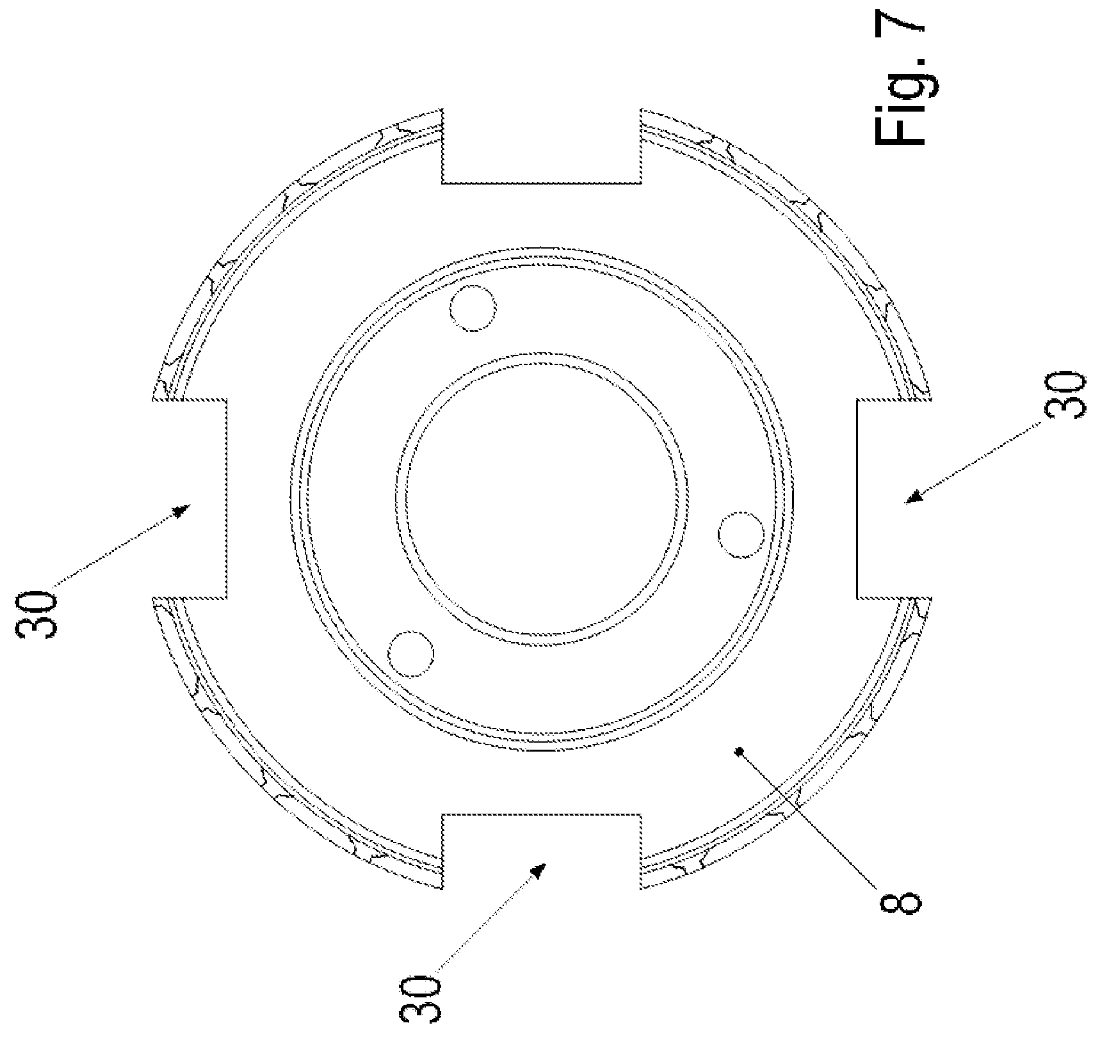
FIG. 7 is a front view of the rotor.

As illustrated in the Figures, the electric motor has a stator housing 1 on the outside of which cooling fins are formed and a connection box is arranged.

Connected to the stator housing 1 is a bearing shield 3 and a bearing flange 4, and the stator housing 1 is arranged between the bearing shield 3 and the bearing flange 4.

The rotor shaft 2 is supported by a first bearing accommodated in the bearing shield 3 and a second bearing accommodated in the bearing flange 4. On the side of the bearing shield 3 facing away from the stator housing 1, a fan 5 is slid onto the rotor shaft 2 and connected in a rotationally fixed manner.

A fan guard 6 surrounds the fan 5 and is fastened to the bearing shield 3.

A, e.g., ring-shaped, rotor 8 is slid onto the rotor shaft 2 and connected, e.g., in force-locking manner, with the rotor shaft 2.

The rotor 8 is made from a material that has a higher permeability than the rotor shaft 2. For example, the rotor shaft 2 is made from case-hardened steel.

The rotor 8 has cutouts axially extending all the way through, e.g., cavities 50, which are provided for accommodating bars of a squirrel cage winding. For this purpose, liquid aluminum-containing or liquid copper-containing material is injected into the cutouts, so that after this material has cooled, the bars are produced.

Axially on both sides, rings 7 are pressed against the rotor 8, which make electrical contact with the bars, e.g., the axial ends of the bars, and thus complete the squirrel cage winding. For this purpose, the rings have elongated holes extending in the circumferential direction, through each of which a screw projects, the respective screw head of which presses the respective ring 7 increasingly axially against the rotor 8 in the manner of a bayonet catch as the rotation of the rings 7 increases relative to the rotor 8, because the wall thickness of the region of the ring 7 accommodating the elongated holes increases in the circumferential direction.

The cutouts are provided with a helix angle. Thus, the cutouts extend increasingly in the circumferential direction in the axial direction. The cutouts are always arranged at the same radial distance.

Axially oriented grooves 30 without a helix angle are arranged to be open radially outwardly and/or are formed in the rotor 8, e.g., the grooves 30 are arranged at a constant radial distance and always remain at the same circumferential angular position in the axial direction, e.g., do not extend increasingly in the circumferential direction.

The grooves 30 are spaced from each other in the circumferential direction, e.g., evenly spaced. For example, four grooves 30 are provided on the outer circumference of the rotor 8.

As a result of the forming of these axially oriented grooves 30, which are open radially on the outside of the rotor 8 towards the external environment, some of the cutouts together with the injected material extend into a respective groove 30. This means that corresponding bars end blindly in the respective grooves and thus cannot conduct current from one of the rings to another of the rings. This is because the grooves are not formed in the rotor 8 until the material has been injected and cooled.

The regions of the originally cylindrical rotor 8 remaining between the grooves 30 in the circumferential direction act as pole regions, which provide for reluctance operation. This is because the remaining regions project radially beyond the grooves and try to align themselves such that the magnetic field lines are as short as possible. Thus, a torque is generated in reluctance mode, which aims to achieve the most synchronous possible rotating motion of the rotor in the rotating field generated by the stator.

In addition, however, the rotor 8 also has a squirrel cage winding which provides for operation as an asynchronous motor. Overall, this provides for an improved start-up of the electric motor, which is operated synchronously with the rotating field after start-up.

The width of the grooves measured in the circumferential direction is smaller than the distance between each two nearest neighboring grooves measured in the circumferential direction.

For example, the rotor 8 has silicon steel. This is because iron silicide has a very high magnetic permeability. In this manner, the rotor 8 can be equipped with a higher magnetic permeability than the rotor shaft 2.

LIST OF REFERENCE NUMERALS

1 Stator housing
2 Rotor shaft
3 Bearing shield
4 Bearing flange
5 Fan
6 Fan guard
7 Ring
8 Rotor, e.g., rotor with pole regions
30 Groove
50 Cavity for bar of squirrel cage winding

The invention claimed is:

1. An electric motor, comprising:

a squirrel cage winding including two rings axially spaced apart from each other and interconnected by bars; and a rotor including cutouts axially extending all the way through, spaced apart from each other in a circumferential direction, and adapted to receive the bars, the rotor including radially outwardly open axial grooves, a radial distance range covered by the axial grooves containing a radial distance range covered by the bars;

wherein first bars of the squirrel cage winding connect the two rings together and other bars of the squirrel cage winding end blindly in respective ones of the radially outwardly open axial grooves; and wherein the other bars of the squirrel cage winding that end blindly in respective axial grooves do not connect the two rings together.

2. The electric motor according to claim 1, wherein the two rings are spaced apart from each other in a direction of an axis of rotation of the rotor and are electrically connected by the bars.

3. The electric motor according to claim 1, wherein a ring axis of the rings and/or of the rings arranged as circular rings is aligned coaxially with an axis of rotation of the rotor.

4. The electric motor according to claim 1, wherein the axial grooves have a vanishing helix angle.

5. The electric motor according to claim 1, wherein the axial grooves have a first helix angle and the bars have a second helix angle different than the first helix angle.

6. The electric motor according to claim 1, wherein the axial grooves extend in an axial direction with a zero helix angle relative to an axis of rotation of the rotor and the bars have a helix angle relative to the axis of rotation of the rotor between 5° and 30°.

7. The electric motor according to claim 1, wherein a circumferential angular extent of the axial groove is constant along an axial length of the axial groove.

8. The electric motor according to claim 1, the axial grooves have a constant cross section along an axial length of the axial groove.

9. The electric motor according to claim 1, wherein a circumferential angular extent of the axial groove at a respective axial position is greater and/or at least three times greater in amount than a circumferential angular extent of the bar.

10. The electric motor according to claim 1, wherein the ring is fastened to the rotor by a bayonet catch.

11. The electric motor according to claim 1, wherein the ring has an elongated hole extending in the circumferential direction, a screw that is screwed into an axially oriented threaded hole of the rotor projecting through the elongated hole, a screw head of the screw pressing the ring onto ends of bars.

12. The electric motor according to claim 11, wherein an axial wall thickness of the ring at an edge region of the elongated hole increases with an increasing circumferential angle and/or with a decreasing circumferential angle.

13. The electric motor according to claim 1, wherein in a circumferential angular region not interrupted by the axial grooves, the cutouts are regularly spaced from each other in the circumferential direction.

14. The electric motor according to claim 1, wherein a material of the rotor has a higher magnetic permeability than a material of a rotor shaft of the electric motor.

15. The electric motor according to claim 14, wherein the material of the rotor includes iron and silicon and/or includes iron silicide.

16. The electric motor according to claim 1, wherein the axial grooves are regularly spaced from each other in the circumferential direction.

17. The electric motor according to claim 1, wherein the electric motor includes between three and nine axial grooves.

18. The electric motor according to claim 1, wherein the axial grooves are formed on the rotor extending all the way through.

19. The electric motor according to claim 1, wherein the rotor includes a stack of metal sheets.

20. The electric motor according to claim 1, wherein the rotor includes a stack of individual punched, metal sheets that are welded together and/or pressed onto each other by a tie rod passing axially through the stack.

21. The electric motor according to claim 20, wherein a stacking direction of the stack is aligned parallel to the axial direction.

22. The electric motor according to claim 1, wherein the other bars of the squirrel cage winding that end blindly in respective axial grooves cannot conduct current between the two rings.

23. An electric motor, comprising:

a squirrel cage winding including two rings axially spaced apart from each other and interconnected by bars; and a rotor including cutouts axially extending all the way through, spaced apart from each other in a circumferential direction, and receiving the bars, the rotor including radially outwardly open axial grooves, a radial distance range covered by the axial grooves containing a radial distance range covered by the bars;

wherein first bars of the squirrel cage winding connect the two rings together and other bars of the squirrel cage winding end blindly in respective axial grooves; and wherein the other bars of the squirrel cage winding that end blindly in respective axial grooves do not connect the two rings together.

* * * * *